(12) United States Patent
Kini et al.

(10) Patent No.: US 8,406,243 B2
(45) Date of Patent: Mar. 26, 2013

(54) FAST LSP ALERT MECHANISM

(75) Inventors: Sriganesh Kini, Fremont, CA (US); Marc Rapoport, Palo Alto, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 428 days.

(21) Appl. No.: 12/710,213

(22) Filed: Feb. 22, 2010

(65) Prior Publication Data

US 2011/0205907 A1    Aug. 25, 2011

(51) Int. Cl.
*H04L 12/28* (2006.01)
*H04L 12/56* (2006.01)

(52) U.S. Cl. .................. 370/409; 370/469; 370/522

(58) Field of Classification Search .................. None
See application file for complete search history.

(56) References Cited

U.S. PATENT DOCUMENTS

| | | |
|---|---|---|
| 7,944,924 B2 | 5/2011 | Patel et al. |
| 2002/0141334 A1 | 10/2002 | Deboer et al. |
| 2002/0172150 A1 | 11/2002 | Kano |
| 2002/0191545 A1 | 12/2002 | Pieda et al. |
| 2003/0112748 A1* | 6/2003 | Puppa et al. .................. 370/217 |
| 2004/0193724 A1 | 9/2004 | Dziong et al. |
| 2006/0198321 A1* | 9/2006 | Nadeau et al. ................ 370/254 |
| 2007/0189265 A1 | 8/2007 | Li |
| 2009/0103442 A1 | 4/2009 | Douville |
| 2009/0161560 A1* | 6/2009 | He et al. ......................... 370/242 |
| 2012/0207017 A1 | 8/2012 | Ceccarelli et al. |

OTHER PUBLICATIONS

M. Bocci, et al.; MPLS Generic Associated Channel; Standards Track; Network Working Group; Jun. 2009; 19 pages, 19.
Kini, et al.; A Fast LSP-alert Mechanism; Network Working Group; Aug. 2010; 7 pages, 7.
PCT International Search Report and Written Opinion; International Appl No. PCT/B2011/050351 filed Jan. 27, 2011.
Pan, et al; Fast Reroute Extensions to RSVP-TE for LSP Tunnels; Network Working Group; 38 pages.
Kini, et al.: "Efficient Fast Re-route (FRR) using Facility backup in ring topology; draft-kini-mpls-ring-frr-facility-backup-00.txt", Internet Engineering Task Force, IETF; Standard Working Draft, Internet Society (ISOC) 4; Feb. 22, 2010, 12 pages.
Non-Final Office Action, U.S. Appl. No. 12/710,244, dated Aug. 30, 2012, 11 pages.

* cited by examiner

*Primary Examiner* — Kevin C Harper (74) *Attorney, Agent, or Firm* — Blakely Sokoloff Taylor & Zafman, LLP (57) ABSTRACT

A method performed on a network element employing Multiprotocol Label Switching (MPLS) to promulgate an alert to each Label Switch Router (LSR) along a Label Switch Path (LSP) by forwarding a labeled packet serving as an alert packet generated by an LSR in the LSP, the method including receiving the labeled packet by the network element from another LSR in the LSP, determining whether the labeled packet is the alert packet by checking a time to live value in an MPLS label header of the labeled packet, determining whether the labeled packet is an operation, administration and maintenance (OAM) packet based on a presence of a generic associated channel label, copying the labeled packet including a label stack of the labeled packet and forwarding the labeled packet to a next LSR in the LSP, whereby the latency in promulgating the alert to each of the LSRs in the LSP is reduced.

18 Claims, 4 Drawing Sheets

FAST LSP ALERT MECHANISM

CROSS-REFERENCE FOR RELATED APPLICATION

The application is related to co-pending patent application Ser. No. 12/710,244 filed on Feb. 22, 2010, having the title "Optimized Fast Re-Route In MPLS Ring Topologies."

FIELD OF THE INVENTION

Embodiments of the present invention relate to a system for managing multiprotocol label switching over a network. Specifically, the embodiments of the invention relate to a method and system for a fast alert mechanism to promulgate data over a label switch path with reduced latency.

BACKGROUND

Multiprotocol label switching (MPLS) is a technology utilized to manage traffic over a network. MPLS uses labels that are assigned to a stream of traffic to route the traffic across the network. Each node of the network supports MPLS by reviewing incoming traffic received over the network and forwarding that traffic based on its label.

MPLS networks with traffic engineering capabilities can optimize traffic engineering resource allocation for customized traffic services. In MPLS networks with traffic engineering, the primary label switch path (LSP) is set up for each customized traffic service. The primary LSP is usually calculated at the head-end node, which is the node where a path originates. The establishment of the primary LSP can be automated. The automated generation of an LSP can be done by the head-end node or a separate path computation element (PCE).

A back-up LSP for each customized traffic service is utilized in case of a failure of the primary LSP and must be configured manually. Each of the links in the back-up LSP is manually selected to construct a back-up LSP with a goal of creating a disjointed path that can be relied upon when the primary LSP is in a state of failure.

When a failure of a link occurs in the primary LSP an LSR that detects the failure initiates a protection switch, where traffic being forwarded over the primary LSP is routed onto the back-up LSP. The LSR that initiates the protection switch must generate a separate alert packet to notify each of the other LSRs in the LSP. The process of generating each packet and separately forwarding them to the respective LSRs creates latency and increases the recovery time required to complete the protection switch. As a result, traffic loss increases during the recovery time as many packets will have to be dropped while the protection switch is being effected.

SUMMARY

A method performed on a network element employing Multiprotocol Label Switching (MPLS) to promulgate an alert to each Label Switch Router (LSR) along a Label Switch Path (LSP) by forwarding a labeled packet serving as an alert packet generated by an LSR in the LSP, the method comprising the steps of receiving the labeled packet by the network element from another LSR in the LSP, determining whether the labeled packet is the alert packet by checking a time to live (TTL) value in an MPLS label header of the labeled packet, determining whether the labeled packet is an operation, administration and maintenance (OAM) packet based on a presence of a generic associated channel label (GAL), when the labeled packet is the OAM packet copying the labeled packet including a label stack of the labeled packet to create a copy of the labeled packet and forwarding the labeled packet to a next LSR in the LSP, whereby the latency in promulgating the alert to each of the LSRs in the LSP is reduced.

A system for implementing Multiprotocol Label Switching (MPLS) to promulgate an alert with reduced latency to each Label Switch Router (LSR) along a Label Switch Path (LSP) by forwarding a labeled packet serving as an alert packet generated by a first LSR in the LSP, the system comprising the first LSR in the LSP adapted to generate the labeled packet having an MPLS label header with a time to live (TTL) value of one, a bottom of stack bit of zero, and a second header including a fast LSP alert indicator, and a second LSR in communication with the first LSR over a network, the second label switch router adapted to receive the labeled packet from the first LSR, determine that the labeled packet is the alert packet by checking the TTL value in the MPLS label header of the labeled packet, determine that the labeled packet is an operation, administration and maintenance (OAM) packet by identifying a generic associated channel label (GAL), copy the labeled packet including a label stack of the labeled packet to create a copy of the labeled packet, and forward the labeled packet to a third LSR in the LSP after the labeled packet is copied.

A network element for implementing Multiprotocol Label Switching (MPLS) to promulgate an alert with reduced latency to each Label Switch Router (LSR) along a Label Switch Path (LSP) by forwarding a labeled packet serving as an alert packet generated by a first LSR in the LSP, the network element comprising a MPLS processing module adapted to receive the labeled packet, determine that the labeled packet is the alert packet by checking a TTL value in an MPLS label header of the labeled packet, determine that the labeled packet is an operation, administration and maintenance (OAM) packet by identifying a generic associated channel label (GAL) in response to determining the labeled packet is the alert packet, and a fast alert processing module coupled to the MPLS processing module, the fast alert processing module adapted to receive the labeled packet from the MPLS processing module in response to determining the labeled packet is the OAM packet, copy the labeled packet including a label stack of the labeled packet to create a copy of the labeled packet in response to determining the labeled packet is the OAM packet, forward the labeled packet to a next LSR in the LSP after copying the labeled packet, and process the copy of the labeled packet.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams will be described with reference to the exemplary embodiments of FIG. 1 and FIG. 2. However, it should be understood that the operations of flow diagrams can be performed by embodiments of the invention other than those discussed with reference to FIG. 1 and FIG. 2, and the embodiments discussed with reference to FIG. 1 and FIG. 2 can perform operations different than those discussed with reference to the flow diagrams of FIGS. 3, 4 and 6.

The techniques shown in the figures can be implemented using code and data stored and executed on one or more electronic devices (e.g., an end station, a network element, etc.). Such electronic devices store and communicate (internally and with other electronic devices over a network) code and data using machine-readable or computer-readable media, such as machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage device and signals carrying the network traffic respectively represent one or more machine-readable or computer-readable storage media and machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premise equipment coupled to an access network (wired or wirelessly) to edge network elements, which are coupled (e.g., through one or more core network elements to other edge network elements) to other end stations (e.g., server end stations)).

The embodiments of the present invention provide a system, network and method for avoiding the disadvantages of the prior art including: latency, traffic loss, long recovery times and additional processing resource requirements.

The embodiments of the invention overcome these disadvantages by defining an identifier in a labeled packet to designate the labeled packet a fast alert packet, sending a single fast alert packet across a label switched path by an originating label switch router, copying the fast alert packet at each receiving label switch router in the label switch path, decrementing a time to live value in the generic associated channel label and forwarding the fast alert packet in the label switch path.

Figure 1:
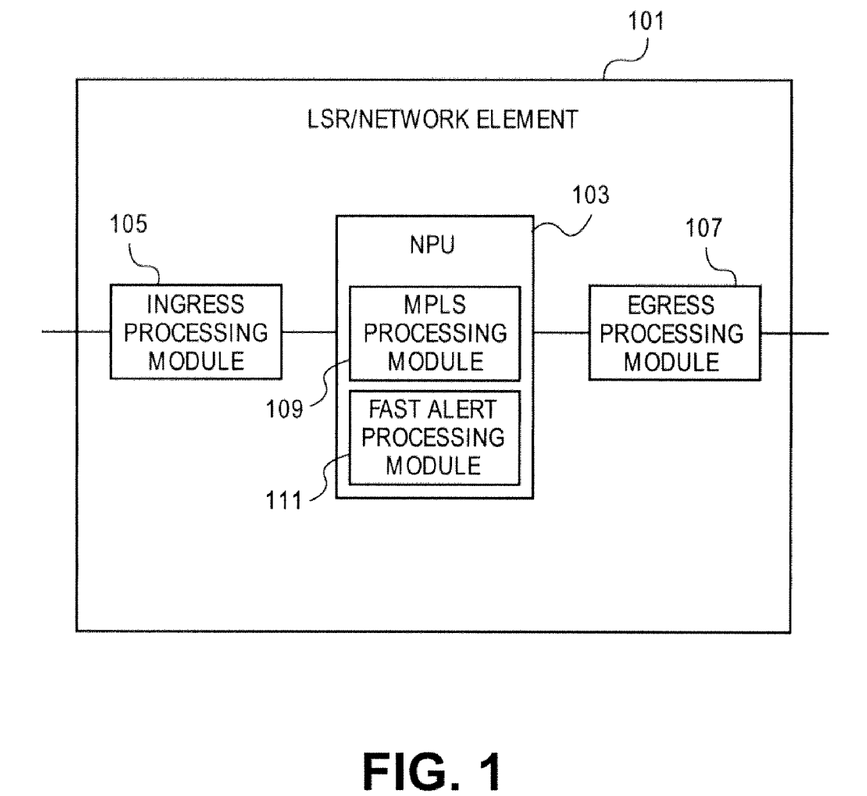
FIG. 1 is a diagram of one embodiment of a network element implementing a fast alert system for multi-protocol label switching.

FIG. 1 is a diagram of one embodiment of a network element implementing the fast alert mechanism for a multi-protocol label switching network. In one embodiment, the network element 101, which may also be referred to as a label switch router (LSR) in the context of a multi-protocol label switching (MPLS) network, includes an ingress processing module 105, an egress processing module 107 and a network processing unit (NPU) 103. One of ordinary skill in the art would understand that the network element 101 can include other components, but for sake of clarity a discussion of these components is not set forth.

The ingress processing module 105 and egress processing module 107 handle the processing of incoming and outgoing packets, respectively. These processing modules handle some or all of the processing of incoming and outgoing packets at the physical layer, data link layer and other layers of the open system interconnection (OSI) reference model below the multi-protocol label switching layer.

The network processing unit 103 can be any type of application specific integrated circuit (ASIC), general purpose processor or similar computational device suitable for handling network related processing of packets. In one embodiment the NPU 103 includes a multi-protocol label switching (MPLS) processing module 109 and a fast alert processing module 111. The MPLS processing module 109 handles all the packet processing related to multi-protocol label switching including label pop and swap operations, label switch path computation operations and similar operations related to the multi-protocol label switching. The fast alert processing module 111 identifies those labeled packets that are fast alert packets and processes these packets. The processing of the fast alert packets includes generating a copy of the packet and forwarding the packet to the next label switch router and label switch path.

Figure 2:
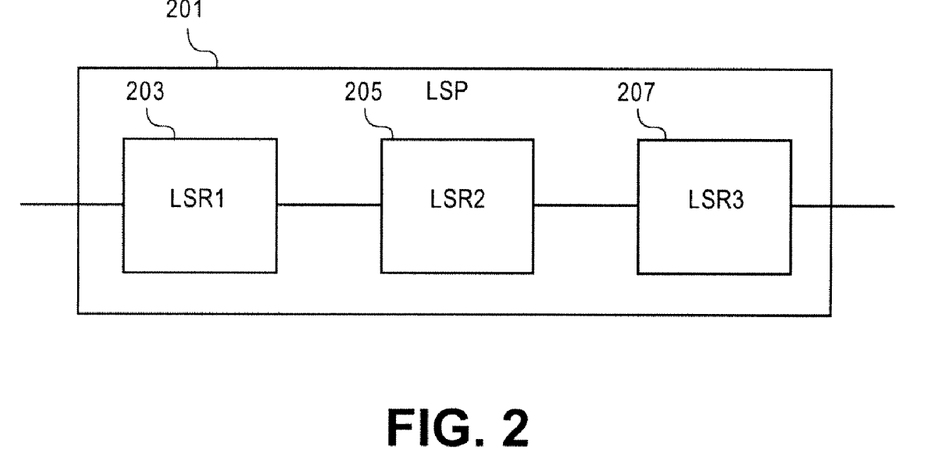
FIG. 2 is a diagram of one embodiment a network implementing a fast alert mechanism for a multi-protocol label switching path.

FIG. 2 is a diagram of one embodiment of a label switch path. The label switch path (LSP) 201 can include any number of label switch routers (LSR) 203-207. Label switch path 201 defines a route over a network in which labeled packets are forwarded. The labeled packets are paired with the label switch path based on the label that identifies both the path and the packet. Each of the nodes in the label switch path 201 is referred to a label switch router. Any number of label switch routers or all of the label switch routers 203-207 in the label switch path 201 can implement the fast alert processing system and method. The fast alert system and method can be utilized to quickly alert each node in a label switch path 201 with control information. For example, if a protection switch is necessary, the head-end node or any node detecting a failure in the label switch path 201 can generate a fast alert packet that is forwarded to each of the label switch routers 203-207 in the label switch path 201. The fast alert packet includes information indicating that each label switch router should perform a protection switch. Without the fast alert mechanism, the time to complete a protection switch or similar operation is significantly increased, because the head-end node or other label switch router that is notifying the other label switch routers 203-207 in the label switch path 201 must generate a separate labeled packet to be sent to each of the label switch routers 203-207 in the label switch path 201. Generating and sending each of these packets is more time consuming and creates more overhead than generating a single packet and having that packet forwarded by each of the label switch routers 203-207 in the label switch path 201.

Figure 3:
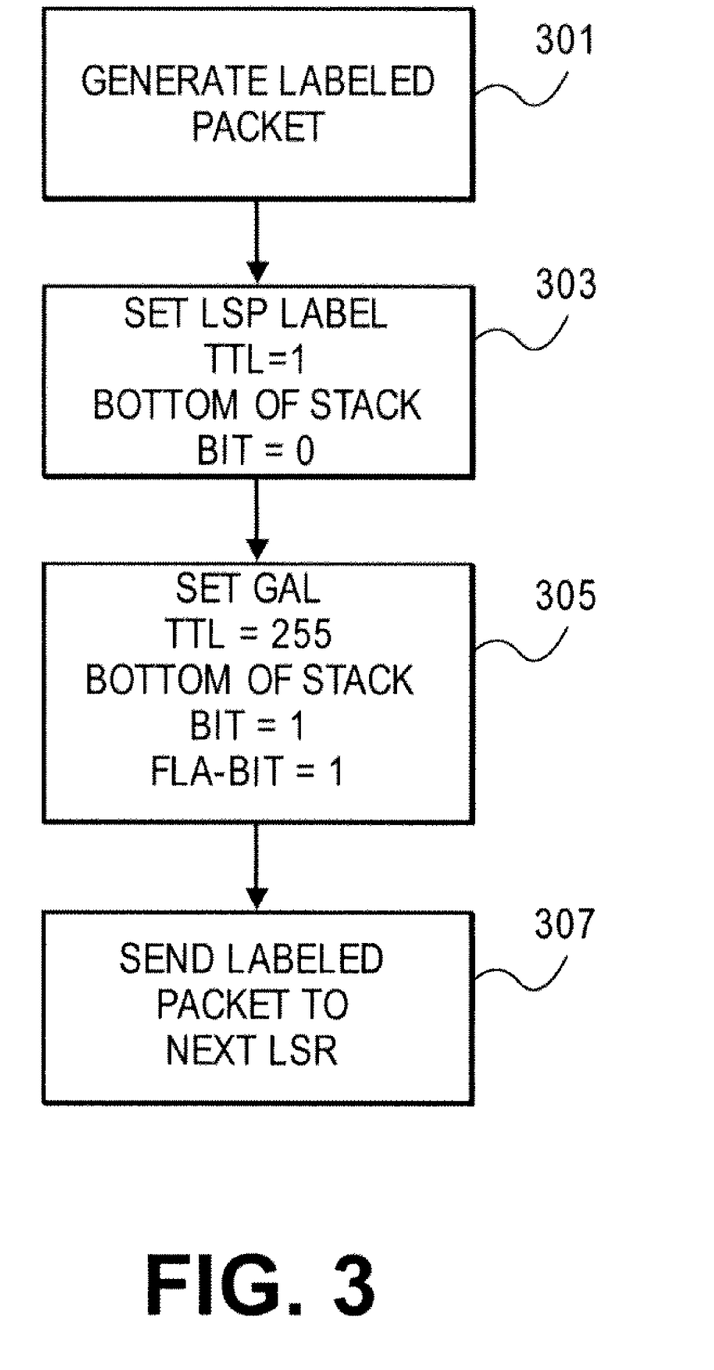
FIG. 3 is a flowchart of one embodiment of a process for generating a fast alert packet.

FIG. 3 is a flowchart of one embodiment of the process for generating a fast alert packet. The fast alert packet can be generated by any label switch router in a label switch path. The fast alert packet can be utilized to transmit any control information to each of the other label switch routers in the label switch path. For example, a fast alert packet can be utilized to indicate that a protection switch is necessary to reroute data traffic from a primary label switch path to a back-up label switch path.

In one embodiment, the process is initiated by an event or process that generates a labeled packet containing control information to be provided to each of the other label switch routers in the label switch path (Block 301). An LSP label in the labeled packet is set to have a time to live (TTL) value of one and a bottom of stack bit (S-bit) of zero (Block 303). These settings indicate to the next LSR that is receives this labeled packet that the labeled packet is an alert packet.

The generic associated channel label (GAL) time to live value is set to a default value, e.g., 255, or to the number of label switch routers in the label switch path, if known. The bottom of stack bit for the GAL is set to one and a fast alert bit is set to one (Block 305). These settings indicate that the special fast alert process is to be utilized by the label switch router to forward the entire labeled packet to the next label switch router in the label switch path. The labeled packet thus configured is then sent to the next label switch router and the label switch path (Block 307).

Figure 4:
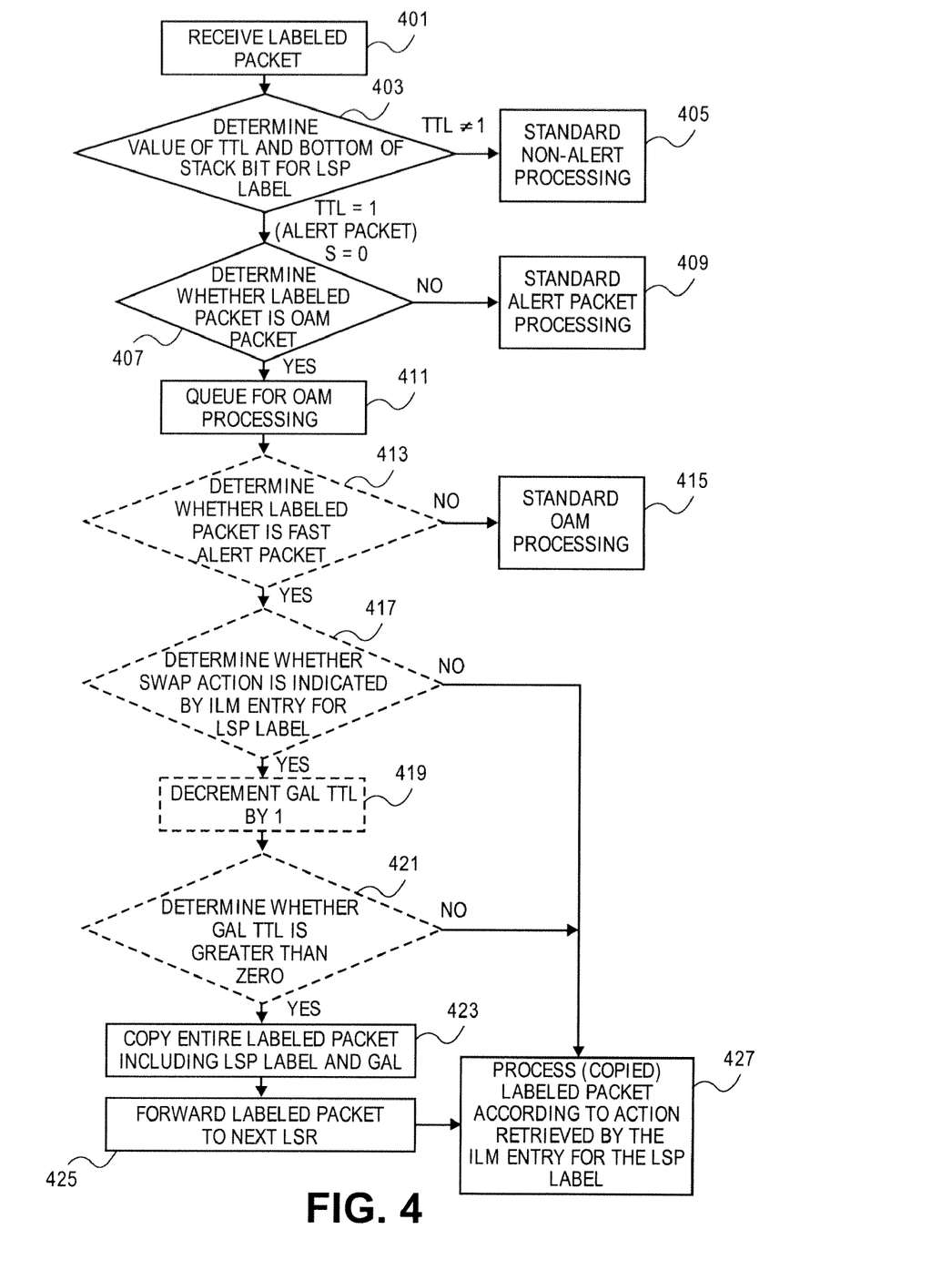
FIG. 4 is a flowchart of one embodiment of a process for processing a fast alert packet at the label switch router.

FIG. 4 is a flowchart of one embodiment of a process for handling a fast alert packet at a label switch router. In one embodiment, the process is initiated by the receipt of a labeled packet at a label switch router (Block 401). The outermost label or first label in the labeled packet is then examined by the network processing unit or similar component of the label switch router that implements multi-protocol label switching to determine the value of the time to live field and the bottom of stack bit field (Block 403). If the time to live value is not equal to one, then the packet is processed as a standard non-alert labeled packet (Block 405). If the LSP label of the labeled packet has a time to live of one and has a bottom of stack bit equal to zero, then the packet is identified as being an alert packet.

A check is then made to determine whether or not the labeled packet is an operations, administration and maintenance (OAM) packet (Block 407). An OAM packet can be identified by the presence of a GAL. If the labeled packet is not an OAM packet, then the label switch router performs the standard alert packet processing (Block 404). If the labeled packet is an OAM packet, then it is queued for OAM processing by the label switch router (Block 411).

As part of the OAM processing, a check is made to determine whether the labeled packet is a fast alert packet (Block 413). The labeled packet can be identified as a fast alert packet by checking whether a fast alert bit is set or a similar indicator is set within the packet (Block 413). In one embodiment, the fast alert bit can be defined as a field of the associated channel header (ACH) or a similar field within the labeled packet. In other embodiments, a new label (e.g., a GAL2 label) can be defined or redefined that includes a field or its presence in a packet indicates that the packet is a fast alert packet. This new label can replace or redefine an existing label (e.g., GAL). In a further embodiment, the new label (e.g., a GAL3) can include a field or its presence in a packet indicates that the packet is a fast alert packet. This new label can be in addition to existing labels (e.g., stacking below the GAL). These embodiments are provided by way of example and not limitation. One skilled in the art would understand that the structures, features and principles can be applied to other configurations and implementations.

If the labeled packet is not a fast alert packet, then the standard OAM processing is applied to the packet by the label switch router (Block 415). If the packet is a fast alert packet, then it is determined whether a swap action is indicated by an incoming label map (ILM) entry for the LSP label (Block 417). An ILM entry is stored in an ILM table, which stores separate entries for each label switch path that traverses the label switch router. If a swap action is not identified by the ILM entry for the LSP label of the labeled packet, then the labeled packet is processed in the label switch router according to an action defined in the ILM entry for the associated label switch path (Block 427).

If a swap action is identified by the ILM entry for the LSP label of the labeled packet, then the GAL time to live value of the labeled packet is decremented by one (Block 419). A determination is then made whether the GAL time to live value is greater than zero (Block 427). This decrementing of the GAL time to live value and the check that the resulting value is greater than zero ensures that the fast alert packet is not looping in the label switch path. If the GAL time to live value is not greater than zero, then the labeled packet is processed according to the action defined in the ILM entry for the LSP label (Block 427).

If the GAL time to live value is greater than zero, then the entire labeled packet is copied including the LSP label and the GAL (Block 423). The labeled packet is then forwarded without further modification to the next label switch path in the label switch path (Block 425). The copied labeled packet is then processed according to the action specified by the ILM entry for the LSP label (Block 427).

Those elements related to the identification of the labeled packet as a fast alert packet and decrementing the GAL are not essential to the operation of the process and have been illustrated with dotted lines in the figure to indicate this. These elements provide additional benefits of using the fast alert process to reduce the time to promulgate information across and LSP and using the GAL time to live value to prevent looping of the alert packets.

Figure 5:
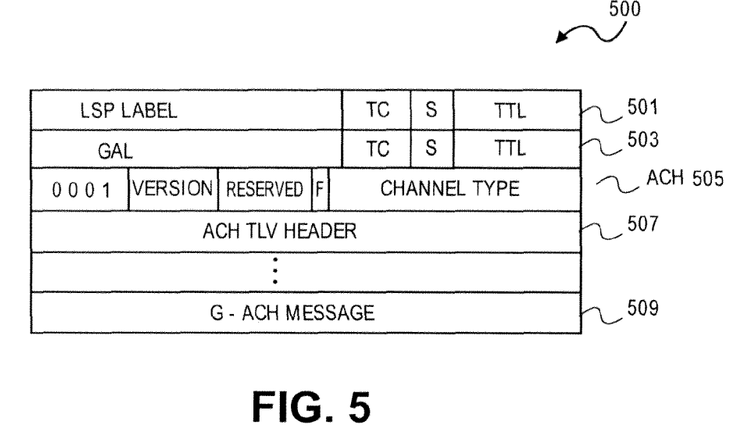
FIG. 5 is a diagram of an example embodiment fast alert packet.

FIG. 5 is a diagram of one embodiment of a labeled packet. The labeled packet 500 can include an LSP label 501, a GAL header 503, an ACH 305, a set of ACH time, length and value (TLV) headers 507 and a generic association channel (G-ACH) message 504. The LSP label and GAL include separate time to live values and bottom of stack bits. The format of the LSP label 501 is specified in RFC 5586. The format of the GAL is also specified in RFC 5586. The ACH 505 includes a set of reserved bits (See RFC ***). In one embodiment, one of the reserved bits is defined as a fast alert bit (F). ACH-TLV headers are defined in RFC 5586. The G-ACH message is defined in RFC 5586.

Figure 6:
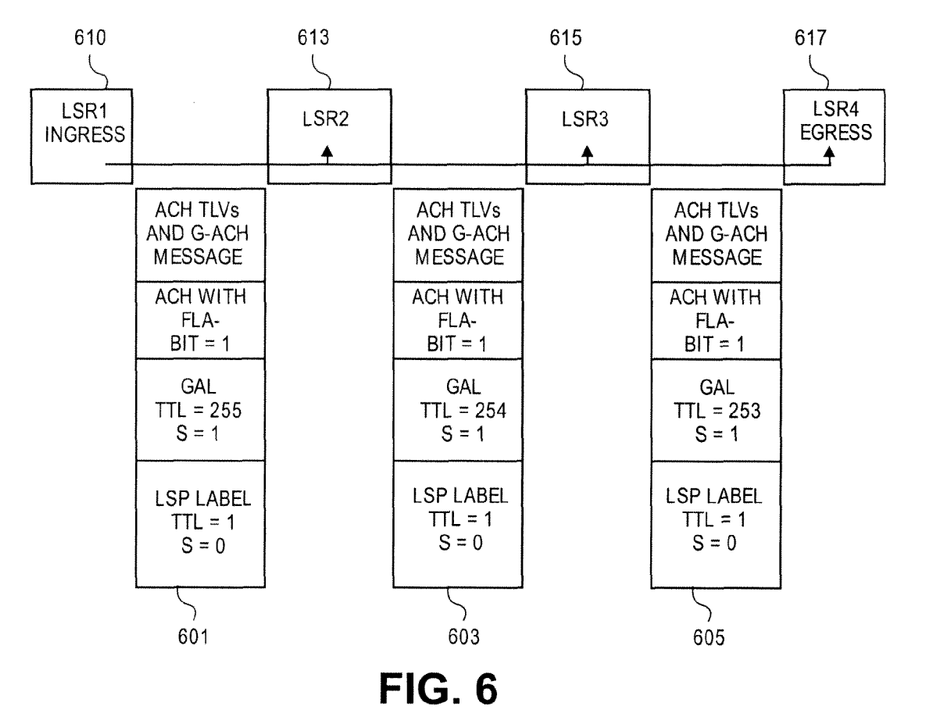
FIG. 6 is a diagram of an example embodiment of a fast alert packet being forwarded over a label switch path.

FIG. 6 is a diagram of one embodiment of a label switched path demonstrating the forwarding of a fast alert packet across each of the label switch routers in the label switch path. In this example, the head-end label switch router 611 generates the first labeled packet 601 having an LSP label with a time to live value of one and a bottom of stack bit with a value of zero. This labeled packet also has a GAL with a time to live value of 255 and a bottom of stack bit of one. The ACH header has the fast alert bit set. The example labeled packet also includes a set of ACH TLVs and a G-ACH message.

When this packet is received by the second label switch router 613, it is processed as described above to identify the labeled packet as a fast alert packet. Once the labeled packet is identified as a fast alert packet, the GAL time to live value of the labeled packet is decremented and then a copy of the labeled packet is forwarded to the third label switch router 615, which performs the same action of decrementing the GAL time to live and forwarding the labeled packet to the final label switch router 617. In each label switch router receiving the labeled packet, one copy of the labeled packet is processed while another is forwarded to the next label switch router until each label switch router receives a copy of the labeled packet or the time to live value of the GAL is zero.

Thus, a method, system and apparatus for a fast alert process for multi-protocol label switching have been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method performed on a network element employing Multiprotocol Label Switching (MPLS) to promulgate an alert to multiple Label Switch Routers (LSRs) along a Label Switch Path (LSP) by forwarding a labeled packet serving as an alert packet generated by an LSR in the LSP and to reduce latency in promulgating the alert to the multiple LSRs in the LSP, the method comprising the steps of:
receiving the labeled packet by the network element from another LSR in the LSP;
determining whether the labeled packet is the alert packet by checking a time to live (TTL) value in an MPLS label header of the labeled packet; and
determining whether the labeled packet is an operation, administration and maintenance (OAM) packet based on a presence of a generic associated channel label (GAL), when the labeled packet is the OAM packet and the alert packet, then copying the labeled packet including a label stack of the labeled packet to create a copy of the labeled packet and forwarding the labeled packet to a next LSR in the LSP.

2. The method of claim 1, further comprising the steps of:
decrementing a time to live value in the GAL of the labeled packet.

3. The method of claim 1, wherein the copying and forwarding of the labeled packet are performed in response to determining that a fast LSP alert bit in an associated channel header of the labeled packet is set.

4. The method of claim 1, wherein the copying of the labeled packet is performed in response to determining that the GAL in the labeled packet includes a TTL value greater than zero.

5. The method of claim 1, further comprising the steps of:
processing the copy of the labeled packet according to an action defined by a corresponding entry in an incoming label map table.

6. The method of claim 1, wherein determining whether the labeled packet is the OAM packet further comprises the steps of:
determining that a bottom of stack bit in the GAL of the labeled packet is set.

7. A system for implementing Multiprotocol Label Switching (MPLS) to promulgate an alert with reduced latency to multiple Label Switch Routers (LSRs) along a Label Switch Path (LSP) by forwarding a labeled packet serving as an alert packet generated by a first LSR in the LSP and to reduce latency in promulgating the alert to the multiple LSRs in the LSP, the system comprising:
the first LSR in the LSP adapted to generate the labeled packet having an MPLS label header with a time to live (TTL) value of one, a bottom of stack bit of zero, and a second header including a fast LSP alert indicator; and
a second LSR in communication with the first LSR over a network, the second label switch router adapted to receive the labeled packet from the first LSR, determine that the labeled packet is the alert packet by checking the TTL value in the MPLS label header of the labeled packet, determine that the labeled packet is an operation, administration and maintenance (OAM) packet by identifying a generic associated channel label (GAL), copy the labeled packet including a label stack of the labeled packet to create a copy of the labeled packet, and forward the labeled packet to a third LSR in the LSP after the labeled packet is copied.

8. The system of claim 7, wherein the second LSR is adapted to decrement a time to live value in the GAL of the labeled packet.

9. The system of claim 7, wherein the second LSR is adapted to copy and forward the labeled packet in response to determining that a fast LSP alert bit in an associated channel header of the labeled packet is set.

10. The system of claim 7, wherein the second LSR is adapted to copy the labeled packet in response to determining that the GAL in the labeled packet includes a TTL value greater than zero.

11. The system of claim 7, wherein the second LSR is adapted to process the labeled packet according to an action corresponding to an incoming label map.

12. The system of claim 7, wherein the second LSR is adapted to determine that a bottom of stack bit in the GAL of the labeled packet is set.

13. A network element for implementing Multiprotocol Label Switching (MPLS) to promulgate an alert with reduced latency to multiple Label Switch Routers (LSRs) along a Label Switch Path (LSP) by forwarding a labeled packet serving as an alert packet generated by a first LSR in the LSP and to reduce latency in promulgating the alert to the multiple LSRs in the LSP, the network element comprising:
- a MPLS processing module adapted to receive the labeled packet, determine that the labeled packet is the alert packet by checking a TTL value in an MPLS label header of the labeled packet, determine that the labeled packet is an operation, administration and maintenance (OAM) packet by identifying a generic associated channel label (GAL) in response to determining the labeled packet is the alert packet; and
- a fast alert processing module coupled to the MPLS processing module, the fast alert processing module adapted to receive the labeled packet from the MPLS processing module in response to determining the labeled packet is the OAM packet and the alert packet, copy the labeled packet including a label stack of the labeled packet to create a copy of the labeled packet in response to determining the labeled packet is the OAM packet, forward the labeled packet to a next LSR in the LSP after copying the labeled packet, and process the copy of the labeled packet.

14. The network element of claim 13, wherein the fast alert processing module is adapted to decrement a time to live value in the GAL of the labeled packet.

15. The network element of claim 13, wherein the fast alert processing module is adapted to copy and forward the labeled packet in response to determining that a fast LSP alert bit in an associated channel header of the labeled packet is set.

16. The network element of claim 13, wherein the fast alert processing module is adapted to copy the labeled packet in response to determining that the GAL in the labeled packet includes a TTL value greater than zero.

17. The network element of claim 13, wherein the fast alert processing module is adapted to process the labeled packet according to an action defined by a corresponding entry in an incoming label map table.

18. The network element of claim 13, wherein the MPLS processing module is adapted to determine that a bottom of stack bit in the GAL of the labeled packet is set.

* * * * *

UNITED STATES PATENT AND TRADEMARK OFFICE
CERTIFICATE OF CORRECTION

PATENT NO.        : 8,406,243 B2
APPLICATION NO.   : 12/710213
DATED             : March 26, 2013
INVENTOR(S)       : Kini et al.

It is certified that error appears in the above-identified patent and that said Letters Patent is hereby corrected as shown below:

In the Specification

In Column 3, Line 39, delete "and" and insert -- and/or --, therefor.

Signed and Sealed this
Twenty-second Day of October, 2013

Teresa Stanek Rea
*Deputy Director of the United States Patent and Trademark Office*